United States Patent [19]

Crawford

[11] Patent Number: 4,517,208

[45] Date of Patent: * May 14, 1985

[54] COMPOSITION FOR TREATING FISH TO INCREASE FISH YIELD

[75] Inventor: David L. Crawford, Astoria, Oreg.

[73] Assignee: Benckiser-Knapsack GmbH, Ladenburg/Neckar, Fed. Rep. of Germany

[ * ] Notice: The portion of the term of this patent subsequent to Feb. 14, 2001 has been disclaimed.

[21] Appl. No.: 570,312

[22] Filed: Jan. 13, 1984

Related U.S. Application Data

[63] Continuation-in-part of Ser. No. 364,715, Apr. 2, 1982, Pat. No. 4,431,679.

[51] Int. Cl.³ ............................ A23B 4/02; A23B 4/10
[52] U.S. Cl. ................................. 426/332; 426/335; 426/643; 426/654
[58] Field of Search ............... 426/266, 643, 332, 335, 426/652, 654

[56] References Cited

U.S. PATENT DOCUMENTS

| | | | |
|---|---|---|---|
| 3,134,678 | 5/1964 | Wierbicki et al. | 426/266 |
| 3,154,423 | 10/1964 | Voegeli et al. | |
| 3,591,389 | 7/1971 | Schneider | 426/643 X |
| 3,620,767 | 11/1971 | Swartz | 426/643 X |
| 3,692,534 | 9/1972 | Ueno et al. | |
| 3,875,313 | 4/1975 | Brotsky | |
| 4,011,346 | 3/1977 | Ernst | |
| 4,076,850 | 2/1978 | Nickerson et al. | |
| 4,136,204 | 1/1979 | Hughes et al. | |
| 4,221,819 | 9/1980 | Falci et al. | 426/643 X |
| 4,267,198 | 5/1981 | Sato et al. | |
| 4,293,578 | 10/1981 | Stone | |
| 4,299,852 | 11/1981 | Ueno et al. | |
| 4,305,966 | 12/1981 | Ueno et al. | |

*Primary Examiner*—Robert Yoncoskie
*Attorney, Agent, or Firm*—Richard S. Roberts

[57] ABSTRACT

The present invention is directed to a fish improvement composition, in its relatively dry form and in its form as a solution, which includes a phosphate mixture component containing a multi-compound phosphate mixture with a specified $P_2O_5$ content range, a preservative component selected from potassium sorbate, sorbic acid and mixtures thereof, and an acid component capable of adjusting the pH of a product containing the composition and a suitable liquid vehicle into the range of from about 5.4 to 6.7.

20 Claims, No Drawings

COMPOSITION FOR TREATING FISH TO INCREASE FISH YIELD

CROSS REFERENCE TO RELATED APPLICATION

This application is a continuation in-part of U.S. patent application Ser. No. 364,715 filed Apr. 2, 1982, now U.S. Pat. No. 4,431,679 granted Feb. 14, 1984, which application is incorporated herein reference.

BACKGROUND OF INVENTION

Although there are many food preservative systems available today, there continues to be a need for a composition having effective multiple component functionality in the area of fish treatment. It is known, for example, that many of the commercially available preservative compositions for meats simply do not work effectively with fish. For this reason, and the fact that fish are particularly difficult to preserve and enhance yield, particular compositions which are unique to fish preservation are often required.

The present invention is specifically directed to a unique composition for treating fish to both increase yield and enhance shelf life. More particularly, the present invention is directed to both a dry and a liquid composition which includes a selected mixture of various phosphates as a yield maintenance component, a preservative (shelf life) component of potassium sorbate and/or sorbic acid, and an acid component such as malic, tartaric or gluconic acids or the edible salts thereof, with an adjusted pH within a specified range.

It is important to recognize that the preservation of edible protein, as well as the yield enhancement thereof, involves many very close arts in which the transfer of technology from, for example, meat treatment to fish treatment is seldom possible. Each type of protein product, poultry, fresh meat, eggs, cheeses, sausages, shell fish, frozen shrimp, fish fillet, etc., all have peculiar biochemical composition with different types of bacteriological problems, taste problems, deterioration, etc. For this reason, the art is replete with may differing compositions which appear at first blush to be similar and yet most often have unique application in only one field for one type of protein product. Such compositions are commercially, technically or other wise unsuccessful or unacceptable when applied to other types of proteins. Thus, as the prior art below illustrates, there is very little that is predictable in this field. As will be more fully disclosed below, the present invention satisfies a long felt need, the solution to which has heretofore evaded the skilled artisan.

PRIOR ART STATEMENT

U.S. Pat. No. 4,305,966 to Ueno et al is directed to preserving bacon by adding a composition comprising a nitrate with no more than 30 ppm of nitrate radical, up to 0.26% potassium sorbate (sorbic acid content), an aqueous solution of an acid, e.g. citric acid, with a pH of 6 or less, and sodium hexametaphosphate. However, this disclosure is not directed to preparations for fish; expressly excludes tripolyphosphates and pyrophosphates (Col. 2, line 47 et seq.); does not disclose the claimed ranges herein; and, unlike the present invention, requires nitrates.

U.S. Pat. No. 4,299,859 to Ueno et al describes a botulinal-resistant meat product preparation which contains sorbic acid or potassium sorbate, glycerol monoester of C-10 to C-12 fatty acids and sodium hexametaphosphate, with or without a nitrous acid compound. However, these teachings involve meat products and not fish; require a fatty acid glycerol monoester; do not establish the required phosphate mixture of the present invention or the ranges, and do not include the herein disclosed acids or salts.

U.S. Pat. No. 4,293,578 to Stone covers the treatment of fresh shrimp to reduce moisture and nutrient loss, the treatment comprising an effective amount (e.g. about 1 to 2%) of $Na_3P_5O_{10}$ (sodium tripolyphosphate) contained within flake ice or crushed ice. It is disclosed that shrimp treatment with a mixture of sodium tripolyphosphate and sodium hexametaphosphate is known to prevent liquid losses. It is also disclosed that the prior art teaches the use of a molecularly dehydrated sodium and potassium phosphate, e.g. sodium tripolyphosphate or an orthophosphate, to increase yield with fish. This patent fails to teach the combination of phosphates claimed herein; fails to teach the combination of the herein acids or edible acid salts with the phosphates of the present invention; and, fails to teach the combination of all of these with the potassium sorbate and/or sorbic acid.

U.S. Pat. No. 4,076,850 teaches the preservation of hard boiled eggs, cooked, peeled shrimp and cooked and uncooked scallops, etc. using a solution of (A.) either (1) methyl parabenzoic acid, or (2) a mixture of sorbic acid with sodium propionate; and (B.) either (1) citric acid neutralized with NaOH or KOH, with a pH of 4.5 to 5.5, or (2) a mixture of sodium or potassium dihydrogen phosphate with sodium or potassium monohydrogen phosphate and phosphoric acid. This patent teaches away from a combination of phosphates and to herein employed acids or edible salts; fails to disclose the phosphate combination of the present invention; requires parabenzoic acid, or sodium propionate and sorbic acid together, and otherwise fails to teach the present invention.

U.S. Pat. No. 4,001,346 to Ernst teaches the preparation of a pet food patty with a preservative composition of a bacteriostatic agent and an edible antimycotic. The bacteriostatic agent may be acid salts such as, for example, calcium acetate and sodium hexametaphosphate, but the agent is preferably an organic acid such as citric acid, etc. The antimycotic is a mixture of sorbic acid and salts thereof. This patent involves animal meat-containing dog food and not fish, it teaches hexametaphosphate as a lesser alternative to an acid and not as a co-component, and it otherwise fails to teach the present invention.

Other United States Patents which teach the use of one or more components of the present invention, but which are believed to be less pertinent than the foregoing prior art references are: U.S. Pat. Nos. 4,267,198; 3,875,313; 3,692,534 and 3,154,423.

SUMMARY OF INVENTION

The present invention is directed to a fillet fish product improvement composition, in its dry form and in its form as a solution, which includes a yield maintenance component containing a phosphate-containing compound mixture with a specified $P_2O_5$ content range, a preservative component selected from potassium sorbate, sorbic acid and mixtures thereof, and an acid component of malic, tartaric or gluconic acid or an edible salt thereof with a pH of about 5.4 to about 6.7, more preferably from about 5.6 to about 6.5.

More particularly the invention provides a fish treatment composition which comprises:

(a) a phosphate mixture containing at least two of the following groups:
  (i) up to about 95% of sodium pyrophosphate (-diphosphate), potassium pyrophosphate (-diphosphate), or a mixture thereof;
  (ii) from about 14% to about 90% of sodium tripolyphosphate, potassium tripolyphosphate, or a mixture thereof;
  (iii) from about 5% to about 50% of sodium hexametaphosphate, potassium hexametaphosphate or a mixture thereof,
  wherein said percentages are by weight based on the weight of the phosphate mixture, and said phosphate mixture has a statistical average content by weight of $P_2O_5$ of about 47% to about 68%; and
(b) a preservative consisting of potassium sorbate, sorbic acid or a mixture thereof, in an amount by weight of about 0.1 to about 0.2 parts per part of said phosphate mixture; and,
(c) a sufficient amount of an acid component selected from the group consisting of one or more of malic, tartaric, and gluconic acids or the edible salts thereof, such that when said composition is present in a suitable liquid vehicle, a pH in the range of about 5.4 to about 6.7 is attained.

DETAILED DESCRIPTION OF THE PREFERRED EMBODIMENT

The present invention fish product improvement composition includes a phosphate mixture component, a preservative component and an acid component. The combination of specific components of the present invention creates a synergistic result whereby the yield maintenance component is more effect than when used alone.

The phosphate mixture component of the improvement compound of the present invention acts to prevent the loss of fluids from the fish product. It aids in the retention of water and organic juices which would otherwise be lost through evaporation, and the like, with the aging of the fish. Without this component, the yield, i.e. the weight of fillet sold as a percentage of its original weight, would decrease rapidly with time. This component prevents the yield from decreasing so rapidly and thus "maintains" the yield. Since the final yield is also greater than it would otherwise be, the yield maintenance phosphate component is alternately characterized as "improving" or "enhancing" the yield.

The phosphate mixture component herein is a two or more compound-containing component. More specifically, this component contains members from at least two of the following groups: (i) up to about 95% by weight of sodium pyrophosphate (-diphosphate), potassium pyrophosphate (-diphosphate) or a mixture thereof; (ii) about 14% to about 90% by weight of sodium tripolyphosphate, potassium tripolyphosphate or a mixture thereof, and (iii) about 5% to about 50% of sodium hexametaphosphate, potassium hexametaphosphate or a mixture thereof. Preferred are the sodium salts, although potassium salts or a mixture thereof may be used. Percentages given are by weight based on the total weight of the phosphate mixture. Preferred ranges for these component groups of the phosphate mixture components are: (i) up to about 80%; (ii) from about 60% to about 90%; and, (iii) from about 10% to about 40%.

The phosphate mixture has a statistical average content by weight of about 47% to about 68% of $P_2O_5$ and is currently available in specific selected compositions within the scope of the foregoing under the trademarks Brifisol, Brifisol D-510 and Brifisol D-512 and sold by BK-Ladenberg Corporation of Cresskill, N.J.

The preservative or shelf life component of the present invention consists of potassium sorbate, sorbic acid or a mixture thereof in an amount by weight of about 0.1 to about 0.2 parts per part of said phosphate mixture, and preferably about 0.13 to about 0.16 parts per part of said phosphate mixture.

The acid component is selected from the group of edible organic acids consisting of malic, tartaric or gluconic acids or the edible salts thereof and also mixtures thereof. The acid component has an equivalent-weight of 30 to 200 and is used in an amount sufficient to adjust the pH into a range of about 5.4 to about 6.7, preferably about 5.6 to about 6.5, and more preferably about 5.8 to about 6.3.

The foregoing components may be combined in "dry" form and transported and stored as such. When being used to coat the fish product, however, a solution form is advantageous. Thus, the dry mixture may be added to any edible liquid vehicle which is functionally inert to the phosphate mixture and preservative components. By functionally inert is meant having no detrimental affect on the functioning of these components. Such edible liquid vehicles may include water, various fats and natural oils, etc. One preferred vehicle is water, most preferably sea-water.

In general, at least about 75% of the total weight of the solution should be the liquid vehicle, preferably, at least about 85% may be used.

What is claimed:

1. A fish treatment composition which comprises:
(a) a phosphate mixture containing at least two of the following groups:
  (i) up to about 95% of sodium pyrophosphate (-diphosphate), potassium pyrophosphate (-diphosphate), or a mixture thereof;
  (ii) from about 14% to about 90% of sodium tripolyphosphate, potassium tripolyphosphate, or a mixture thereof;
  (iii) from about 5% to about 50% of sodium hexametaphosphate, potassium hexametaphosphate or a mixture thereof,
  wherein said percentages are by weight based on the weight of the phosphate mixture, and said phosphate mixture has a statistical average content by weight of $P_2O_5$ of about 47% to about 68%; and
(b) a preservative consisting of potassium sorbate, sorbic acid or a mixture thereof, in an amount by weight of about 0.1 to about 0.2 parts per part of said phosphate mixture; and,
(c) a sufficient amount of an acid component selected from the group consisting of one or more of malic, tartaric, and gluconic acids or the edible salts thereof, such that when said composition is present in a suitable liquid vehicle, a pH in the range of about 5.4 to about 6.7 is attained.

2. The fish treatment composition of claim 1 wherein said phosphate mixture consists of the sodium compounds.

3. The composition of claim 1 wherein said phosphate mixture contains at least two of the following:

(i) about 0% to about 80% of sodium pyrophosphate (-diphosphate), potassium pyrophosphate (-diphosphate), or a mixture thereof;

(ii) about 60% to about 90% of sodium tripolyphosphate, potassium tripolyphosphate, or a mixture thereof;

(iii) about 10% to about 40% of sodium hexametaphosphate, potassium hexametaphosphate or a mixture thereof, 4. The composition of claim 1 wherein said preservative is present in an amount of from about 0.13 to about 0.16 parts per part of said phosphate mixture.

5. The composition of claim 1 wherein said ingredient (c) is present in an amount sufficient to adjust the pH into a range of about 5.6 to about 6.5.

6. The composition of claim 1 wherein said ingredient (c) is present in an amount sufficient to adjust the pH into a range of about 5.8 to about 6.3.

7. A product which comprises the composition of claim 1 and a compatible liquid vehicle, said vehicle being present in an amount of at least 80% by weight of the product.

8. The product of claim 7 wherein said phosphate mixture consists of the sodium compounds.

9. The product of claim 7 wherein said phosphate mixture contains at least two of the following:

(i) about 0% to about 80% of sodium pyrophosphate (-diphosphate), potassium pyrophosphate (-diphosphate), or a mixture thereof;

(ii) about 60% to about 90% of sodium tripolyphosphate, potassium tripolyphosphate, or a mixture thereof;

(iii) about 10% to about 40% of sodium hexametaphosphate, potassium hexametaphosphate or a mixture thereof, 10. The product of claim 7 wherein said preservative is present in an amount of about 0.13 to about 0.16 parts per part of said phosphate mixture.

11. The product of claim 7 wherein said ingredient (c) acid is present in an amount sufficient to adjust the pH of said product into a range of about 5.6 to about 6.5.

12. The product of claim 7 wherein said ingredient (c) acid is present in an amount sufficient to adjust the pH of said product into a range of about 5.8 to about 6.3.

13. The product of claim 7 wherein said liquid vehicle comprises water.

14. A method of treating fish comprising applying to the surface of said fish an effective amount of the composition of claim 1.

15. A method of treating fish comprising applying to the surface of said fish an effective amount of the product of claim 7.

16. A method of treating fish fillet comprising applying the product of claim 7 to a fish fillet.

17. The method of claim 15 wherein said vehicle comprises water.

18. The method of claim 16 wherein said vehicle comprises water.

19. The composition of claim 1 wherein said phosphate mixture comprises sodium tripolyphosphate and sodium hexametaphosphate; and said preservative comprises potassium sorbate.

20. The product of claim 7 wherein said liquid vehicle is sea water and is present in an amount of at least 85%.

* * * * *